United States Patent [19]
Honda

[11] 3,791,717
[45] Feb. 12, 1974

[54] LIGHT MODULATION APPARATUS
[75] Inventor: Masanori Honda, Yokohama, Japan
[73] Assignee: Fujitsu Limited, Kawasaki, Japan
[22] Filed: Nov. 6, 1972
[21] Appl. No.: 304,039

[30] Foreign Application Priority Data
Nov. 8, 1971 Japan............... 46-88821

[52] U.S. Cl. .............................. 350/160
[51] Int. Cl. ............................. G02f 1/36
[58] Field of Search ........... 350/160, 96 WG

[56] References Cited
UNITED STATES PATENTS
3,524,064 8/1970 Keyes............... 350/160 R Primary Examiner—William L. Sikes
Attorney, Agent, or Firm—Daniel Jay Tick

[57] ABSTRACT

Light modulation apparatus or a light repeater directly modulates a light beam into light and comprises a light modulation element having a photoconductive effect and the Franz-Keldysh effect. When intensity modulated light is emitted to the light modulation element, the applied electric field in the light modulation element is controlled. Non-modulated light applied to the light modulation element undergoes intensity modulation due to the Franz-Keldysh effect related to the variations of the applied electric field.

11 Claims, 8 Drawing Figures

FIG. 5a
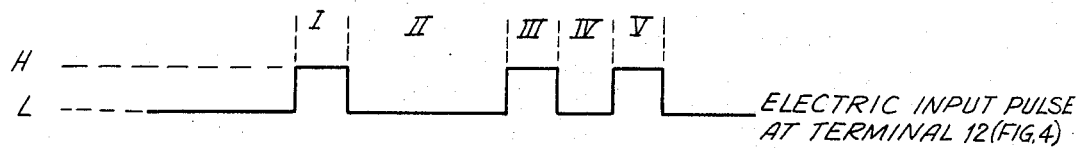
ELECTRIC INPUT PULSE AT TERMINAL 12 (FIG.4)
FIG. 5b
LASER BEAM OUTPUT OF ELEMENT 7
FIG. 5c
LASER BEAM OUTPUT OF ELEMENT 10
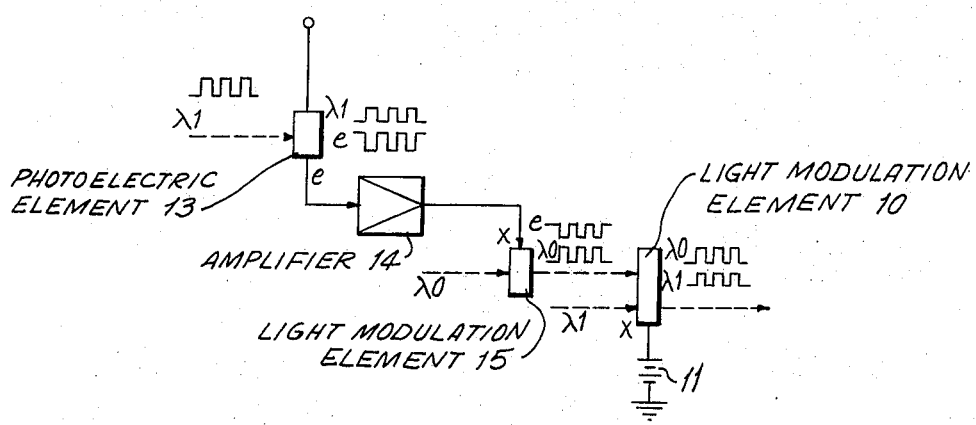
FIG. 6

LIGHT MODULATION APPARATUS

BACKGROUND OF THE INVENTION

The present invention relates to light modulation apparatus. More particularly, the invention relates to light modulation apparatus utilizing a light modulation element which provides the Franz-Keldysh effect and a photoconductive effect.

The advent of the laser has brought optical communication systems into the spotlight. In order to realize a long distance optical communication system, a light repeater is necessary. A small sized, unattended light repeater is indispensable in an optical multiplexing communication system. At the present time, various research is being continued in an attempt to provide such a light repeater by developing an optical integrated circuit or light IC. A light IC is described generally in Electronics Magazine of Aug. 31, 1970, published by the McGraw-Hill Publishing Company.

Since there is no useful light device presently known which directly amplifies the modulated laser beam, the light IC detects the base band and amplifies it in order to feed it to a laser diode. The light radiated from the laser diode is thus intensity modulated. In addition, a regenerating amplifier is required in frequency division multiplexing. However, from the point of view of manufacturing techniques, it is very difficult to combine the base band detector and regenerating amplifier as a light IC. In order to realize laser beam modulation, various effects should be considered. These are the electro-optic effect, the Faraday effect, pumping modulation, the Franz-Keldysh effect and higher order nonlinear effects.

The Franz-Keldysh effect is hereinafter referred to as the FK effect.

In the development of the aforedescribed light IC, research is being continued simultaneously for an application of light modulation utilizing the electro optic effect. However, the modulation efficiency of light is generally very low, so that the determination of the bandwidth is very difficult. Furthermore, a pulse code modulation or PCM and amplitude modulation or AM system is presently anticipated as a light communication system. However, it is very difficult to provide a system including existing polarizer and electro-optic crystals by utilizing a light IC. It is therefore urgent that a new system be developed.

The principal object of the invention is to provide light modulation apparatus having considerably improved modulation efficiency.

An object of the invention is to provide light modulation apparatus having a considerably improved modulation circuit.

Another object of the invention is to provide light modulation apparatus or a light repeater which directly intensity modulates a laser beam by utilizing intensity modulated light.

Still another object of the invention is to provide light modulation apparatus or a light repeater which eliminates the base band detector and regenerating amplifier utilized in presently known light IC's.

Yet another object of the invention is to provide light modulation apparatus which operates efficiently, effectively and reliably.

BRIEF SUMMARY OF THE INVENTION

In accordance with the invention, a light modulation element provides both the FK effect and a photoconductive effect. An energizing DC source is connected to the light modulation element and the intensity modulated light is transmitted to the light modulation element. The non-modulated light is admitted to the light modulation element. Non-modulated light is thus intensity modulated by the intensity modulated light.

BRIEF DESCRIPTION OF THE DRAWINGS

In order that the invention may be readily carried into effect, it will now be described with reference to the accompanying drawings, wherein:

FIGS. 5a, 5b and 5c are graphical presentations illustrating the relationship of electrical signals and light signals in the light communication system of FIG. 4; and FIG. 6 is a schematic diagram of an embodiment of the light modulation apparatus of the invention.

In the FIGS. the same components are identified by the same reference numerals.

DETAILED DESCRIPTION OF THE INVENTION

Figures 1, 2:
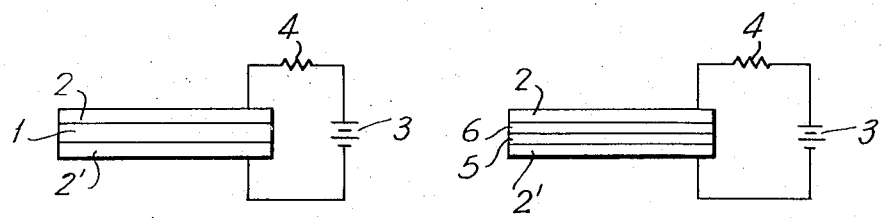
FIG. 1 is a sectional view and circuit diagram of an embodiment of the light modulation element of the light modulation apparatus of the invention.
FIG. 2 is a sectional view and a circuit diagram of another embodiment of the light modulation element of the light modulation apparatus of the invention.

The light modulation element 1 of the embodiment of FIG. 1 comprises materials such as, for example, cadmium sulfide or CdS and cadmium selenide or CdSe. The light modulation element has both the FK effect and a photoconductive effect and also has high resistance values. Transparent electrodes 2 and 2' are provided on both sides of the layer 1 of material. The transparent electrodes 2 and 2' are electrically connected to a DC source 3 of electrical power. The DC source 3 provides an electric field of $10^5 \sim 10^6$ volts per centimeter in the layer 1 of high resistance material via a current limiting impedance 4.

The FK effect permits the fundamental absorption edge wavelength to elongate by application of an electric field. The photoconductive effect varies the resistance value of the layer 1 by application of light. A single crystal type is desirable for the layer 1 of high resistance material, since it facilitates handling. However, a polycrystal and amorphous phase may also be utilized. It is most preferable and desirable to utilize as the layer 1 of high resistance material a single crystal of cadmium sulfide having a thickness of several microns.

A single crystal of cadmium sulfide having a specific resistance of $0.1 \sim 1.0$ ohm centimeter is developed into material having a specific resistance of approximately $10^{12}$ ohm centimeters by doping a deep level dopant like silver. The single crystal of cadmium sulfide produced in this manner is cut 5 millimeters in length, 5 millimeters in width and 10 microns in thickness, and is polished to an optical surface.

The transparent electrodes 2 and 2' may comprise any suitable film such as, for example, metallic film or Nesa film. In the above embodiment it is better to form the electrodes 2 and 2' on a single crystal tip of cadmium sulfide by vacuum deposition of indium oxide or $In_2O_3$.

As hereinafter described, incoming light and modulated light are applied to a region of a surface of the light modulation element.

In the embodiment of FIG. 2, the light modulation element comprises a layer 5 having the FK effect, but not a photoconductive effect, and a layer 6 of material having a photoconductive effect on the layer 5. The light modulation element of FIG. 2 is thus of a multilayer type having a FK effect layer 5 and a photoconductive effect layer 6. The transparent electrodes 2 and 2' are the same as the electrodes of the embodiment of FIG. 1.

The layer 5 of material may comprise gallium phosphide or GaP and the layer 6 of material may comprise cadmium sulfide or CdS. The light modulation element of FIG. 2 may be manufactured in the following manner. A single crystal of gallium phosphide having a specific resistance of 600 ohm centimeters is prepared as the substrate. The surface of the single crystal substrate is a 111 gallium surface. The substrate is then set in a substrate holder with its 111 gallium surface placed downward. The substrate holder is fixed inside a pit provided in a corner surface of a pedestal comprising graphite in order to accommodate the cadmium sulfide granule.

The pedestal is housed in a quartz reaction tube and is heated up to 800°C by high frequency heating provided via a heating winding around the reaction tube. During heating, the quartz reaction tube is filled with hydrogen gas. The cadmium sulfide is vaporized as the heating of the pedestal progresses. A thin film of hexagonal cadmium sulfide is then produced on the 111 gallium surface. The transparent electrodes 2 and 2' are preferably and desirably formed on both sides of the layers 5 and 6 by the vacuum deposition of indium oxide or $In_2O_3$, as described with reference to the embodiment of FIG. 1.

When the embodiment of FIG. 2 is utilized, the fundamental absorption edge wavelength of the layer 5 of material having the FK effect should not always be placed close to the wavelength showing the photoconductive effect.

Figure 3:
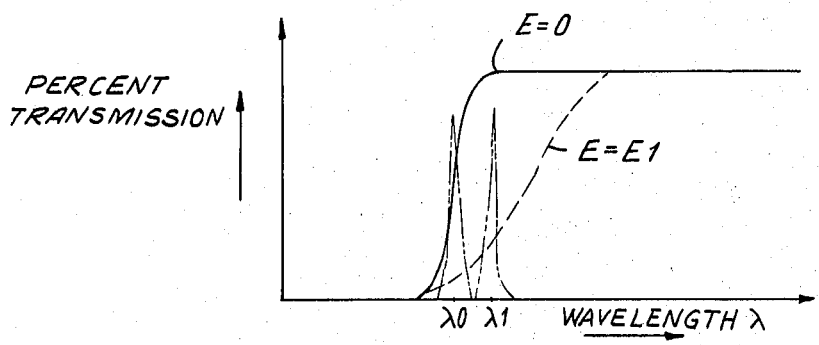
FIG. 3 is a graphical presentation of a spectral transmission of the light modulation element of FIGS. 1 and 2.

In the graphical presentation of FIG. 3, the abscissa represents the wavelength $\lambda$ and the ordinate represents the percent transmission. The solid line curve of FIG. 3 shows the spectral transmission when the applied electric field E is zero. When the electric field, E equals $10^5 \sim 10^6$ volt centimeters, and is applied to the light modulation element, the spectral transmission is that shown by the broken line curve in FIG. 3.

In many cases, the fundamental absorption edge wavelength and the wavelength at the maximum photosensitivity are almost the same, or similar, to each other. Thus, for example, the fundamental absorption edge wavelength of the single crystal of cadmium sulfide is approximately 5,000 A and its photoconductive effect reaches a maximum at approximately 5,000 A. Therefore, when the fundamental absorption edge wavelength is indicated by $\lambda 0$ and the layer 1 of the light modulation element of FIG. 1 comprises material having the maximum photoconductive effect when receiving light having a wavelength $\lambda 0$, its spectral transmission, as hereinbefore described, changes as shown in FIG. 3, in accordance with the applied electric field.

When light having a wavelength $\lambda 0$ impinges upon, or is applied to, the electrodes of the light modulation element and electrical power is supplied to the light modulation element, the applied electric field becomes approximately zero. This is due to the changing of the high resistance to a low resistance caused by the photoconductive effect. The spectral transmission indicated by the broken line in FIG. 3 then becomes that indicated by the solid line.

Figure 4:
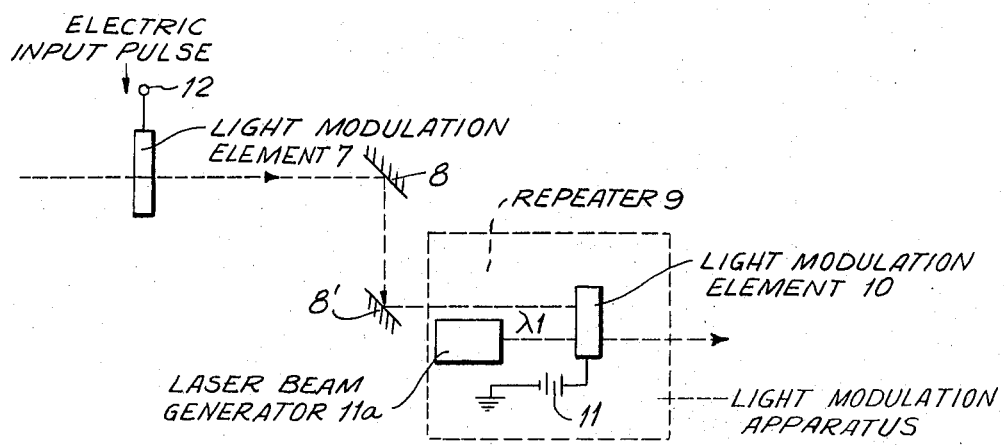
FIG. 4 is a schematic diagram of an embodiment of a light communication system utilizing the light modulation apparatus of the invention.

In the light communication system of FIG. 4, a laser beam having a wavelength $\lambda 0$ is transmitted from a transmitter and is intensity modulated at the transmitter by a light modulation element 7 having only the FK effect. The intensity modulated laser beam is fed via a transmission loop or reflectors 8 and 8' to a repeater 9. The repeater 9 comprises the light modulation apparatus of the present invention. A light modulation element 10 comprises either the embodiment of FIG. 1 or the embodiment of FIG. 2.

A DC power supply source 11 is similar to the DC power source 3 of FIGS. 1 and 2. The repeater 9 comprises a laser beam generator 11a which produces a laser beam functioning as the carrier transmitted from the repeater. The laser beam produced by the laser beam generator 11a has a wavelength $\lambda 1$. The non-modulated laser beam of wavelength $\lambda 1$ and incoming modulated light are applied to the surface of one of the transparent electrodes of the light modulation element 10.

When an electrical input pulse, as shown in FIG. 5a, is supplied to a signal input terminal 12 of the light modulation element 7, said input pulse causes said light modulation element to cut off the laser beam of wavelength $\lambda 0$ due to the FK effect. When no electric input pulse is supplied to the input terminal 12, the laser beam of wavelength $\lambda 0$ passes through the light modulation element 7. This permits the obtaining of a laser beam as shown in FIG. 5b.

The intensity modulated laser beam, shown in FIG. 5b, is transmitted via the transmission loop 8, 8' and impinges upon the light modulation element 10 of the repeater 9. The transmitted laser beam may be attenuated, however. Since the light modulation element 10 is of high sensitivity, its photoconductive effect is sufficient. Simultaneously, the non-modulated laser beam of wavelength $\lambda 1$ continuously impinges upon the light modulation element 10. Furthermore, the laser beam of wavelength $\lambda 1$ is cut off by the light modulation element 10 due to the FK effect, unless the laser beam of wavelength $\lambda 0$ is not applied to said light modulation element.

In an example of operation, when a single crystal of cadmium sulfide is utilized as the light modulation element 10, the most suitable wavelength $\lambda 0$ is 5,000 A and the most suitable wavelength $\lambda 1$ is 5,100 A. Since the wavelength of the modulated light is $\lambda 0$ and it has a waveform shown in FIG. 5b, the light modulation element 10 has a high resistance during the time period I of FIGS. 5a, 5b and 5c. There is no modulated light having a wavelength $\lambda 0$. The applied electric field is thus maintained high. The spectral transmission shown by broken line in FIG. 3 may thus be obtained. In other words, a small amount of laser beam of wavelength $\lambda 1$ passes through the light modulation apparatus 10 of FIG. 4 and is as shown in FIG. 5c.

During the time period II of FIGS. 5a, 5b and 5c, when the light beam or laser beam of wavelength λ0 impinges upon the light modulation element 10, the resistance of said light modulation element decreases to a low value due to its photoconductivity and the applied electric field approaches zero. The spectral transmission shown by solid line in FIG. 3 may thus be obtained. The laser beam of wavelength λ1 is thus capable of passing through the light modulation element 10 and the output level of said laser beam is increased, as shown in FIG. 5c.

The modulation efficiency of the light modulation apparatus of the present invention has reached 80 percent and may be further increased by selection of the wavelength of the light used. Furthermore, the light modulation apparatus of the invention has confirmed that modulation of high efficiency is provided thereby due to utilization of the FK effect.

As hereinbefore described, a light beam of wavelength λ1 which corresponds to a light beam of wavelength λ0, as shown in FIG. 5b, may be obtained. In other words, a light beam may be directly modulated by another light beam.

The light modulation apparatus or light repeater of the invention does not utilize or include a base band detector or a regenerating amplifier, as widely utilized in present light IC's.

When the light modulation element 10 of FIG. 2 is utilized in light modulation apparatus, there is no need to consider the difference between the wavelengths λ0 and λ1. Thus, for example, when a crystal of gallium phosphide is utilized as the layer 5 and a crystal of cadmium sulfide is utilized as the layer 6 (FIG. 2), the wavelength λ0, which produces a photoconductive effect, and the wavelength λ1 of the modulated light are set at 5,000 A and 6,300 A, respectively, in this case, the phase relation between the modulating light λ0 and the modulated light λ1, which is the relation between the waveforms shown in FIGS. 5b and 5c, respectively, is exactly reversed.

In the light modulation apparatus of FIG. 6, an intensity modulated carrier of wavelength λ1 is applied to or impinges upon a photoelectric element 13. The light beam of wavelength λ1 is converted by the photoelectric element 13 into an electrical signal having the same pulse configuration and arrangement as the light beam. The phase relation between these pulses is maintained at a phase difference of $\pi$.

The electrical pulse e produced by the photoelectric element 13 is amplified by an amplifier 14 and is supplied to a light modulation element 15 having only the FK effect. The light modulation element 15 intensity modulates a laser beam of wavelength λ0. The modulated laser beam of wavelength λ0 is transmitted from the light modulation element 15 to the light modulation element 10, which is that shown in FIG. 4. Simultaneously, a non-modulated laser beam λ1 is applied to, or impinges upon, the light modulation element 10. The laser beam λ1 is modulated into a pulse of the same arrangement as the laser beam of wavelength λ0 by the light modulation element 10.

In the light modulation apparatus of the embodiment of FIG. 4, the wavelengths of the modulating light and the modulated light are different from each other. In the light modulation apparatus of the embodiment of FIG. 6, however, the wavelengths of the modulating and modulated light are not different. Two laser beams are required in the light modulation apparatus of FIG. 6. This may be simplified, however, by utilizing a laser beam generator of known type which generates two types of laser beams.

The invention has hereinbefore been described as a single channel light communication system, illustrated in FIGS. 4 and 6. The light modulation apparatus of the invention may, however, be utilized in multichannel communication systems by including time division multiplexing systems or multiple arranged pulses which may be attained by gradually changing the fundamental absorption edge wavelengths in the light modulation element 10.

While the invention has been described by means of specific examples and in specific embodiments, I do not wish to be limited thereto, for obvious modifications will occur to those skilled in the art without departing from the spirit and scope of the invention.

I claim:

1. Light modulation apparatus, comprising
   a light modulation element having the Franz-Keldysh effect and a photoconductive effect;
   electrical energizing means for applying a DC voltage between the electrodes of the light modulation element to produce an electric field in the light modulation element;
   light means for transmitting incoming intensity modulated light to the light modulation element, the distribution of electric field in the light modulation element being regulated continuously by the modulated light; and
   additional light means for transmitting non-modulated light to the light modulation element simultaneously with the modulated light.

2. Light modulation apparatus as claimed in claim 1, wherein the light modulation element comprises cadmium sulphide.

3. Light modulation apparatus as claimed in claim 1, wherein the light modulation element comprises cadmium selenide.

4. Light modulation apparatus as claimed in claim 1, wherein the wavelength of the intensity modulated light is different from the wavelength of the non-modulated light.

5. Light modulation apparatus as claimed in claim 1, wherein the intensity modulated light and the non-modulated light are laser beams.

6. Light modulation apparatus as claimed in claim 1, wherein the light modulation element comprises a first layer of material having the Franz-Keldysh effect and a second layer of material having a photoconductive effect, the first and second layers being juxtaposed thereby leaving a free surface of each, and a pair of transparent electrodes each on the free surface of a corresponding one of the first and second layers.

7. Light modulation apparatus, comprising
   photoconductive transducing means for converting a light signal pulse into an electrical signal pulse;
   input means for transmitting incoming intensity modulated light to the photoconductive transducing means;
   a first light modulation element having the Franz-Keldysh effect;
   electrical conducting means for conducting an electrical signal pulse from the photoconductive transducing means to the first light modulation element;

light means for transmitting a first light beam to the first light modulation element;

a second light modulation element having the Franz-Keldysh effect and a photoconductive effect;

additional light means for transmitting intensity modulated light to the second light modulation element; and further light means for transmitting a second light beam to the second light modulation element.

8. Light modulation apparatus as claimed in claim 7, wherein the wavelength of the intensity modulated light is different from the wavelength of the second light beam.

9. Light modulation apparatus as claimed in claim 7, wherein the intensity modulated light and the first and second light beams are laser beams.

10. Light modulation apparatus as claimed in claim 7, wherein the second light beam comprises non-modulated light.

11. Light modulation apparatus, comprising a light modulation element having the Franz-Keldysh effect and a photoconductive effect, the light modulation element comprising a first layer of gallium phosphide having the Franz-Keldysh effect and a second layer of cadmium sulphide having a photoconductive effect, the first and second layers being juxtaposed thereby leaving a free surface of each, and a pair of transparent electrodes each on the free surface of a corresponding one of the first and second layers;

electrical energizing means for producing a DC electric field in the light modulation element;

light means for transmitting incoming intensity modulated light to the light modulation element; and additional light means for transmitting non-modulated light to the light modulation element.

* * * * *